United States Patent
Levin et al.

(10) Patent No.: US 6,259,746 B1
(45) Date of Patent: *Jul. 10, 2001

(54) METHOD FOR ALLOCATING DATA AND POWER IN A DISCRETE MULTI-TONE COMMUNICATION SYSTEM

(75) Inventors: Howard E. Levin; Michael R. May, both of Austin; Matthew A. Pendleton, Cedar Park, all of TX (US)

(73) Assignee: Motorola Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/007,218

(22) Filed: Jan. 14, 1998

(51) Int. Cl.$^7$ ............................... H04L 27/04; H04J 3/22
(52) U.S. Cl. ............................... 375/295; 370/468
(58) Field of Search ................ 375/357, 360, 375/240, 295, 222; 370/480, 468; 455/59, 343; 379/93.1

(56) References Cited

U.S. PATENT DOCUMENTS

| | | | |
|---|---|---|---|
| 4,328,581 | 5/1982 | Harmon et al. | 371/8 |
| 4,679,227 | 7/1987 | Hughes-Hartogs | 375/58 |
| 4,833,706 | 5/1989 | Hughes-Hartogs | 379/98 |
| 5,309,503 | 5/1994 | Bruckert et al. | 379/60 |
| 5,400,322 | 3/1995 | Hunt et al. | 370/19 |
| 5,475,864 | 12/1995 | Hamabe | 455/33.1 |
| 5,479,447 | 12/1995 | Chow et al. | 375/260 |
| 5,548,819 | 8/1996 | Robb | 455/59 |
| 5,596,604 | 1/1997 | Cioffi et al. | 345/260 |
| 5,598,435 | 1/1997 | Williams | 375/261 |
| 5,603,082 | 2/1997 | Hamabe | 455/33.1 |
| 5,774,500 * | 6/1998 | Zogakis et al. | 375/261 |
| 5,790,550 * | 8/1998 | Peeters et al. | 370/480 |
| 5,812,599 * | 9/1998 | Van Kerckhove | 375/260 |
| 5,822,374 | 10/1998 | Levin | 375/260 |
| 5,903,608 * | 5/1999 | Chun | 375/260 |
| 6,009,122 * | 12/1999 | Chow | 375/260 |

FOREIGN PATENT DOCUMENTS

| | | | |
|---|---|---|---|
| 0 753 947 A1 | 1/1995 | (EP) | H04L/5/06 |
| 0 753 948 A1 | 1/1995 | (EP) | H04L/5/06 |
| 0 9030 752 A2 * | 7/1999 | (EP) | H04L/27/26 |

OTHER PUBLICATIONS

Alliance for Tellecommunications Industry Solutions, "Asymmetric Digital Subscriber Line (ADSL) Metallic Interface", Draft American National Standard for Telecommunications. Network and Customer Installation Interfaces, T1E1.4/94–007R7, pp. i–xii and pp. 2–171.

Chow, et al., "A Practical Discrete Multitone Transceiver Loading Algorithm for Data Transmission over Spectrally Shaped Channels", IEEE Transactions on Communications, vol. 43, No. 2/3/4, pp. 773–775 (1995).

Cioffi, "DMT Information Bus for Multidrop Interface on Existing Wiring", T1E1.4/94–126, pp. 1–6 (1994).

(List continued on next page.)

Primary Examiner—Tesfaldet Bocure

(57) ABSTRACT

In the present invention, carriers associated with a discrete multi-tone (DMT) communications system (10) are sorted according to bit allocation capacity. The number of bits needed to attain a specified bit rate are then allocated beginning with the carrier having the greatest bit allocation capacity and proceeding toward the carrier having the least bit allocation capacity until all bits to are allocated. Once allocated, the power to any unused bins is reduced. Different subsets of the carriers between line cards can be specified in order to reduce crosstalk between adjacent lines.

21 Claims, 4 Drawing Sheets

OTHER PUBLICATIONS

Levin, et al., U.S. Appl. No. 08/660,380 filed on Jun. 7, 1996.

Levin, U.S. Appl. No. 08/937,759 filed on Sep. 25, 1997.

American National Standard Institute (ANSI) for Telecommunicationx—"Network and Customer Installation Interfaces—Asymmetric Digital Subscriber Line (ADSL) Metallic Interface", Aug. 18, 1995, N.Y., pp. 1–170.

European Search Report (2 pgs.).

* cited by examiner

SNR TABLE

| BITS | SNR$_{REF}$ |
| --- | --- |
| 2 | 14 |
| 3 | 19 |
| 4 | 21 |
| 5 | 24 |
| 6 | 27 |
| 7 | 30 |
| 8 | 33 |
| 9 | 36 |
| 10 | 39 |
| 11 | 42 |
| 12 | 45 |
| 13 | 48 |
| 14 | 51 |
| 15 | 54 |

METHOD FOR ALLOCATING DATA AND POWER IN A DISCRETE MULTI-TONE COMMUNICATION SYSTEM

CROSS-REFERENCE TO RELATED APPLICATIONS

A related application entitled "Method for Allocating Data in a Data Communication System," by Levin, and having U.S. Pat. No. 5,852,633, issued on Dec. 12, 1998 has been previously filed.

A related application entitled "Method and Apparatus for Configuring a Communication System," by Levin, having application Ser. No. 08/937,759, has been previously filed.

A related application entitled "Method For Fine Gains Adjustment In An ADSL Communications System" by Levin, and having U.S. Pat. No. 5,822,374, issued on Oct. 13, 1998 has been previously filed.

A related application entitled "Method For Allocating Data And Power In A Discrete Multi-Tone Communication System " by Johnson, and having application Ser. No. 09/007,390 has been filed concurrently with the present application.

FIELD OF THE INVENTION

This invention relates generally to a communication system and more specifically to a method for improving power consumption of a discrete multi-tone system.

BACKGROUND OF THE INVENTION

In order to make high data rate interactive services such as video conferencing and internet access available to more residential and small business customers, high speed data communication paths are required. Although fiber optic cable is the preferred transmission media for such high data rate services, it is not readily available in existing communications networks, and the expense of installing fiber optic cable is prohibitive. Current telephone wiring connections, which consist of twisted pair media, were not designed to support the high data rates required for interactive services such as video on demand or even high speed interconnects. In response, Asymmetrical Digital Subscriber Line (ADSL) technology has been developed to increase the transmission capabilities within the fixed bandwidth of existing twisted pair connections, allowing interactive services to be provided without requiring the installation of new fiber optic cable.

Discrete Multi-Toned (DMT) is a multi-carrier technique that divides the available bandwidth of a communications channel such as a twisted pair connection into a number of frequency sub-channels. These sub-channels are also referred to as frequency bins or carriers. The DMT technique has been adopted by the ANSI T1E1.4 (ADSL) committee for use in ADSL systems. In ADSL, DMT is used to generate 250 separate 4.3125 kHz sub-channels from 26 kHz to 1.1 MHz for downstream transmission to the end user, and 25 sub-channels from 26 kHz to 138 kHz for upstream transmission by the end user. Each bin is allocated a number of bits to send with each transmission. The number of bits allocated to an ADSL system are 0, and 2–15 bits.

Prior to transmitting real-time data with an ADSL system, an initialization process occurs. During a first portion of the initialization process, an activation and acknowledgment step occurs. It is during this step that a transmit activation tone is generated following power-up of the ADSL system. Transceiver training is the next step of the initialization process. During transceiver training, the equalization filters of the ADSL system are trained and system synchronization is achieved. Next, channel analysis and exchange are performed as part of the initialization processes. During the channel analysis and exchange, the Signal to Noise Ratio (SNR) of the channels is determined, and bit loading configuration of the bins and other configuration information is transferred.

Subsequent to the initialization process, real-time data transmission begins. During real-time data transmission, proposed implementations of the ANSI standard require that each carrier be transmitted with a nominal amount of power. The nominal amount of power is proposed to be a full amount of power that is approximately the same across all bins, as only a fine power gain adjustment variation occurs between carriers. However, there are disadvantages to assigning the nominal amount of transmit power to each carrier. For example, one problem is that there is unnecessary power consumption associated with assigning a nominal amount of power to a carrier that is not transmitting any data. This occurs when the requested data rate is less than the maximum data rate achievable on the line. This additional power results in additional system costs in terms of power consumption. Another issue of transmitting power on unused bins is that as a carrier's signal is attenuated over long line distances, there is a point where data cannot be transmitted with a desired certainty. When this occurs, the bit allocation capacity of the bad bin is set to zero, however, under proposed implementations of the specification, its transmit power remains allocated to the now unused bin. Therefore, there is a high cost in power even when there is not a high data rate. Another issue with the ADSL specification is that crosstalk interference occurs when signals are being transmitted at similar frequencies on adjacent lines.

Generally, over one-half of the power consumed by a typical DMT system is consumed by the line drivers. In addition to the thermal issues associated with increased power, there is an additional problem that crosstalk from adjacent phone lines can increase line noise levels as much as 40 dB. Therefore, it would be beneficial to optimize power consumption of a DMT system, and reduce cross-talk between adjacent twisted pair wires.

BRIEF DESCRIPTION OF THE DRAWINGS

The invention will be described with reference to the following figures.

DETAILED DESCRIPTION OF THE DRAWINGS

Figure 1:
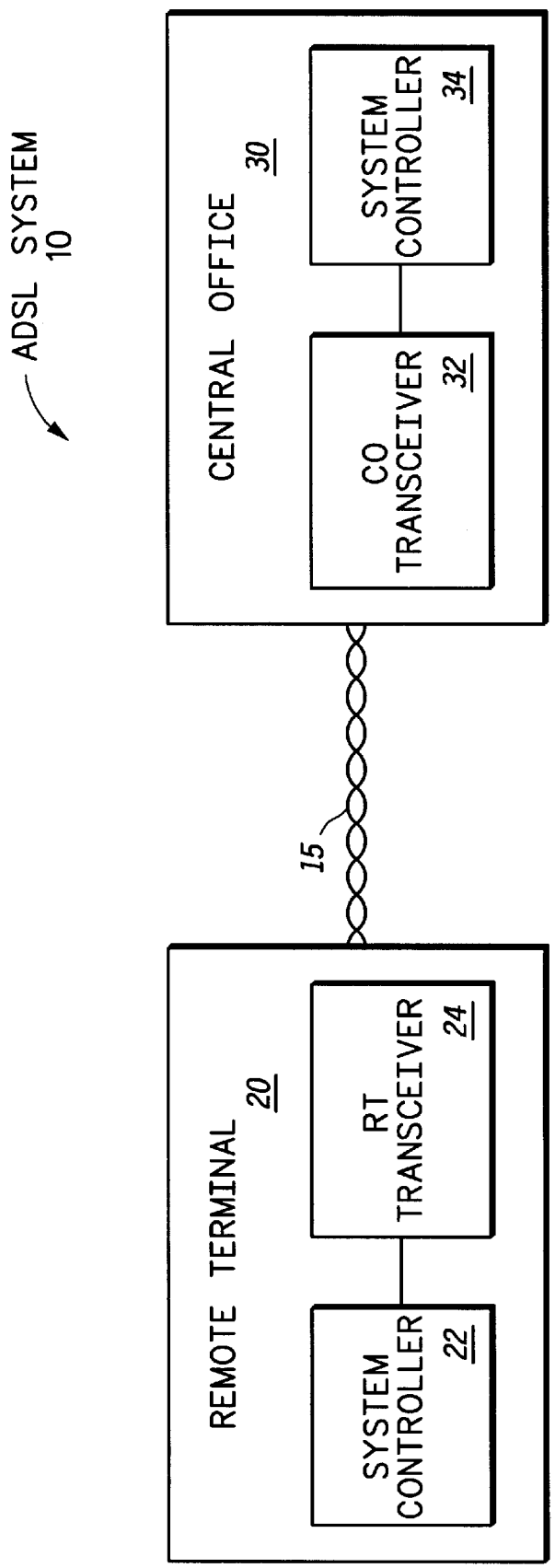
FIG. 1, illustrates an ADSL system in block form.

FIG. 1 illustrates an ADSL system 10. The ADSL system 10 comprises a remote terminal 20, and a central office 30 connected by a twisted pair transmission media. The remote terminal 20 and central office 30 each comprise a system controller 22 and 34, respectively. In addition, the remote terminal 20 and central office 30 respectively comprise a transceiver 24 and 32. The ADSL system 10 is capable of implementing the present invention. In operation, the central office 30 transmits downstream data across the transmission media 15 to the remote terminal 20 The data is received at the remote terminal 20 by the transceiver 24, which provides the received data to the system controller 22 for further processing. In a likewise fashion, the upstream data would be transmitted from the remote terminal 20, across the transmission media 15, and received by the central office transceiver 32, which provides the data to the system controller 34.

Figures 2, 3:
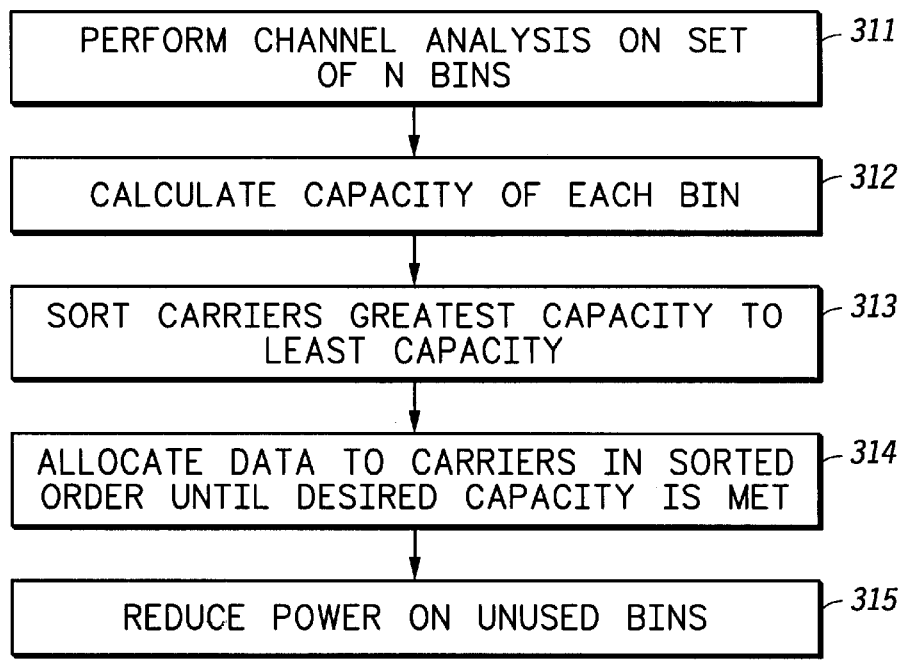
FIG. 2, illustrates an SNR reference table.
FIGS. 3–5, illustrate in flow diagram form, specific methods for optimizing the power of a DMT system.

FIG. 2 illustrates an SNR reference table for use within the ADSL system 10. The SNR reference table indicates an SNRref value, which is the SNR needed for a bin to transmit a specific number of bits at a specific Bit Error Rate (BER). For example, according to the table of FIG. 2, a bin which is determined to have an SNR of 30 would be able to transmit seven bits of data. Also, the values of SNR reference table will vary depending upon the type of error correction used, if any. For example, the use of error correction could reduce each SNRref value in FIG. 2 by three. This reduction would allow a bin having a SNR of 30 to transmit eight bits. Generally, the SNR reference table will be empirically derived, but can also be derived based upon simulated or theoretical results.

FIG. 3 illustrates a method for implementing the present invention. While the specific embodiment will address a specific DMT implementation, it is to be understood that the present invention applies to any DMT implementation. At step 311, an analysis of an ADSL channel is performed. In one embodiment of the present invention, the channel analysis step 311 would return a signal-to-noise ratio (SNR) for a channel in an initial state. Generally, the channel analysis step 311 of FIG. 3 is performed as part of the initialization process. However, other implementations where the steps of FIG. 3 are performed during real time operation are anticipated by the present invention.

At step 312, the data capacity of each bin is calculated. In one embodiment, the data capacity is calculated based upon the SNR of a carrier, as determined in step 311, and the SNR reference table of FIG. 2. The data capacity can be determined by identifying, for a given SNR reference table, the maximum number of bits that can be transmitted. For example, according to the table of FIG. 2, the maximum number of bits that could be allocated to a bin having an SNR of 32 is seven bits.

Figure 4:
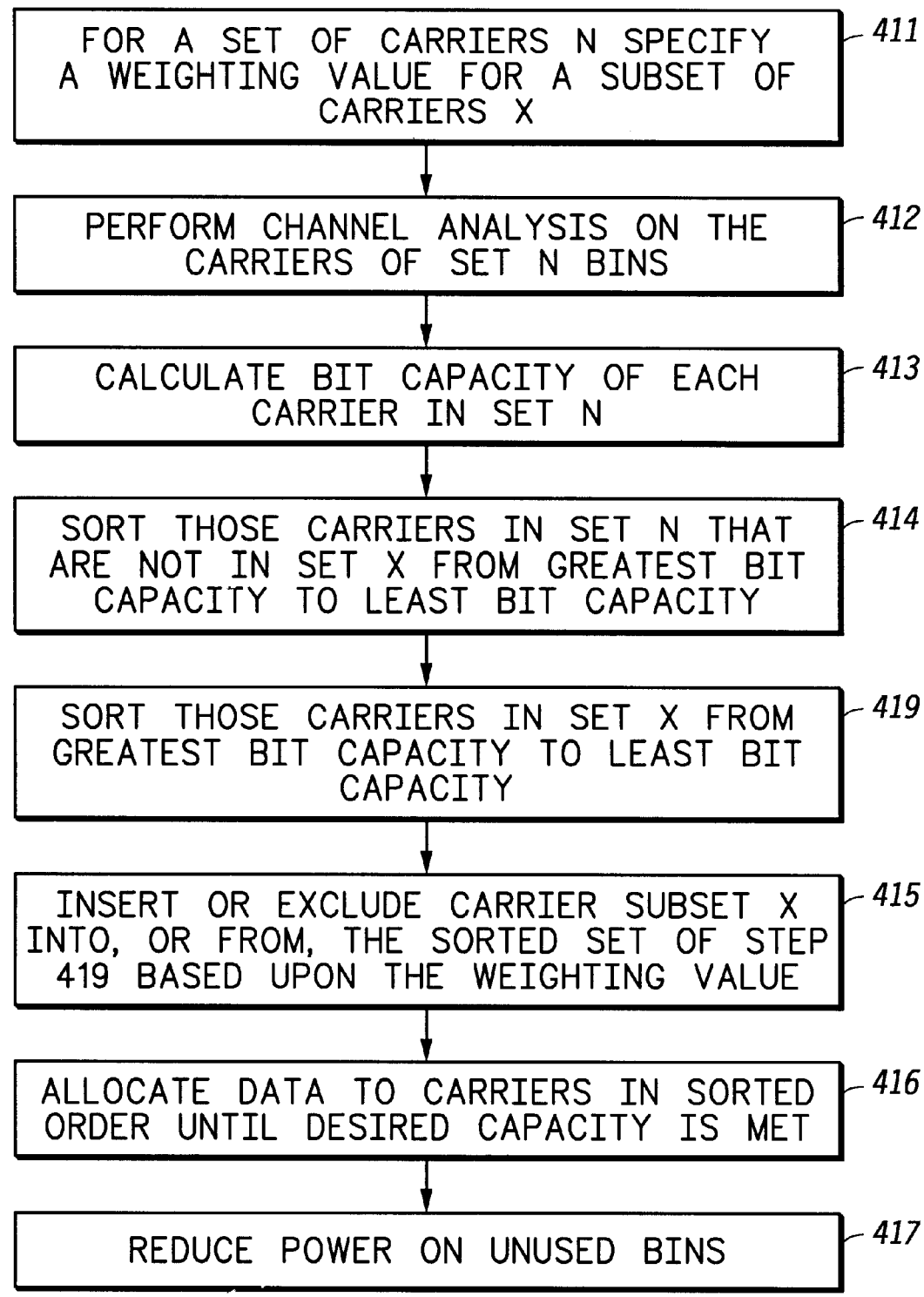

Next, at step 313, the carriers or bins are sorted from greatest capacity to least capacity. Next, at step 314, the data rate to be transmitted is allocated beginning with the carrier (s) with the greatest capacity and proceeding to the carrier(s) with the least capacity. The data capacity is allocated until the specified data rate is achieved. By allocated to those bins with the greatest data rate first, it is possible to minimize the number of carriers used (used carriers) to transmit data at the desired data rate. At step 315, the power on the unused carriers is reduced in order to minimize the power used to transmit a specified amount of information. Generally, the power will be reduced by at least an order of magnitude of a the power of a used bin. This is advantageous over the prior art which has required each channel to maintain a nominal amount of power whether it is used or unused. By reducing power to unused bins, an optimal amount of power dissipation is possible FIG. 4 illustrates a different embodiment of the present invention. At step 411, for a set of carriers N, a subset carrier X is specified. The subset X will generally represent carriers which are to be preferred or avoided during the bit loading allocation process. The subset X is then weighted. The weighting can be explicit, whereby weighting value is specified by a user, or implicit, whereby the system would have a default weighting for the subset X. For example, the subset X could implicitly be heavily weighted. The function of the weighting will be discussed with reference to step 415.

At step 412, a channel analysis is performed on each carrier of set N. The channel analysis of step 412 is performed in the same manner as the channel analysis of step 311 of FIG. 3, as previously discussed. Next, at step 413, the bit loading capacity for each bin in carrier set N is calculated. This step is analogous to step 312 of FIG. 3.

At step 414, the carriers of set N that are not in set X are sorted from greatest bit loading capacity to least bit loading capacity to form a sorted set of carriers. This step is analogous in function to step 313 of FIG. 3, except that it is performed on a subset of the set.

At step 419, the carriers y in set X are also sorted from greatest bit loading capacity to least bit loading capacity to for another sorted set. In an alternative embodiment, the set X need not be sorted.

At step 415, the bins associated with carrier subset X are inserted or excluded from the sorted set of carriers y to create a set z. In one embodiment, where the bins of set X are implicitly heavily weighted, the set would be positioned in the sorted set before, or after, bins meeting some predefined criteria. For example, heavily weighted bins could be positioned before the bins with the greatest capacity such that a new first member of set Z is also a member of set X. In another embodiment, the heavily weighted bins could be positioned between bins having a capacity of ten bits, and bins having a capacity of nine bits. Generally, a heavily weighted set is inserted with bins having significant bit allocation capacity. In one embodiment, where 15 bits is the maximum loading for a bin, a heavily weighted set would generally be inserted at or above the 7 bit allocation level.

In a similar manner, where the bins of set X are implicitly lightly weighted, they could be excluded from the sorted list entirely, inserted after the bins with the least bit loading capacity, or inserted between bins having a specified loading level. Generally, a lightly weighted set is inserted with bins having low bit allocation capacity. In one embodiment, where 15 bits is the maximum loading for a bin, a lightly weighted set would generally be inserted below the 7 bit allocation level.

In an embodiment where a numerical weighting is applied the exact placement of the bins of set X would be placed, or excluded, based upon the value of the weighting.

At step 416, the number of bits needed to support a specified data rate are allocated to the bins based upon the sorted order of the set. For example, assuming the set X is inserted between bins having loading capacity of 13 and 14 bits. The allocation would begin with a bin, not in set X, having 15 bits of loading capacity. Once the first bin was assigned 15 bits, another bin, not in set X, having 15 bits of capacity would be assigned 15 bits, and so on until all 15 bit bins are fully assigned. Next, all 14 bit bins, not in set X would be filled in a similar manner. Next, the bits of set X would be filled prior to the loading of any 13 bit capacity bin which is not in set X. Subsequent to each bin of set X being filled, the filling process would continue with the 13 bit capacity bins.

Figure 5:
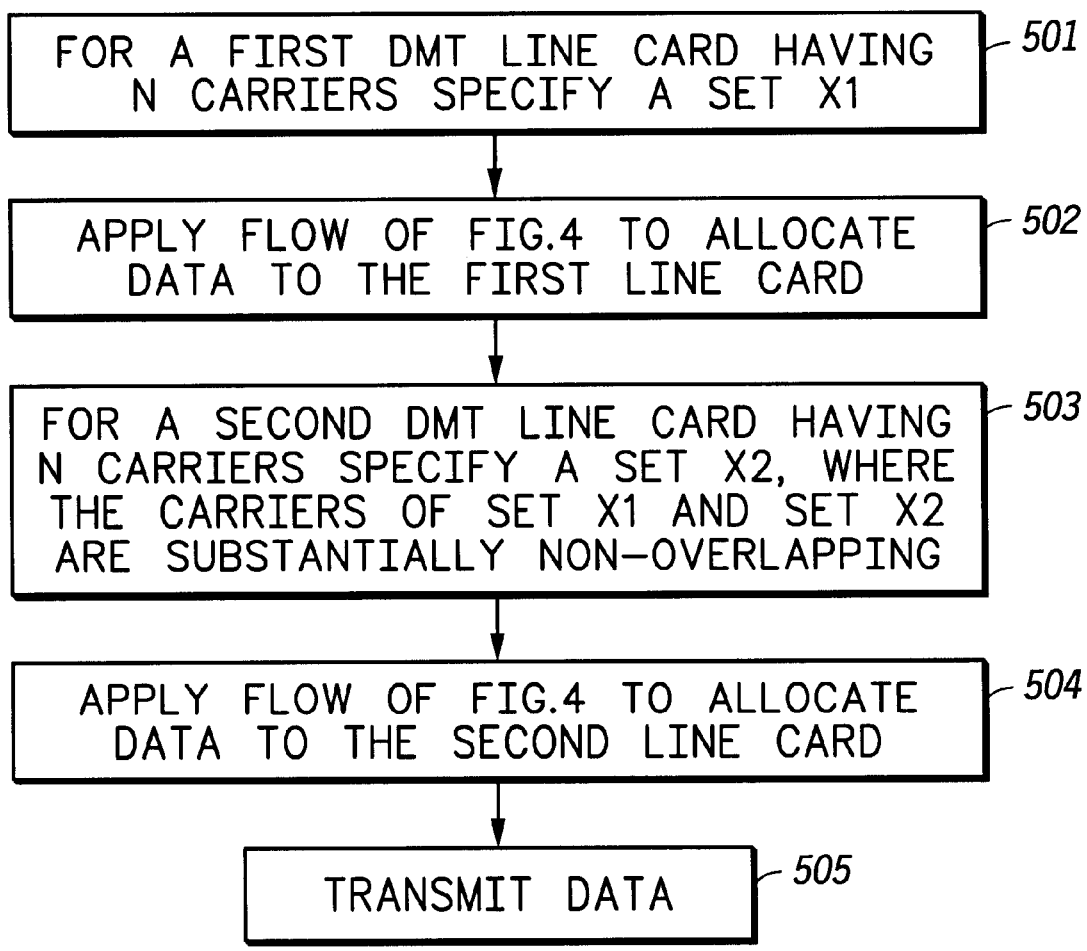

FIG. 5 illustrates another embodiment of the present invention whereby crosstalk between adjacent lines can be reduced. At step 501, a subset of carriers X1 is specified for a first line card. At step 502, the flow of FIG. 4 is applied to the subset X1. This in effect minimizes the number of carriers line card 2 needs to drive in order to support a specific data rate.

At step 503, a subset of substantially non-overlapping carriers X2 is a specified for a second line card. In one embodiment, the sets X1 and X2 would be mutually exclusive in that they would attempt to allocate the data capacity to bins operating at different frequencies. In yet another embodiment, the sets X1 and X2 would be chosen to buffer used bins in separate line cards from each other. For example, if set X1 specified bins 1–10 as bins to be filled first, set X2 would indicate bins 12–21 as bins to be filled first. To the extent the bit loading capacity could be allocated within the specified bins, there would be an unused bin, bin 11, buffering the frequency range of set X1 and X2. This buffering allows for greater immunity to cross talk.

Once set X2 is defined, the method of FIG. 4 is applied in order to optimize power of the system. At step 505, data transmission occurs, allowing for optimization of power dissipation and limiting crosstalk among adjacent lines.

The foregoing specification has identified a preferred method for improving power consumption of an ADSL system. The invention has been described with reference to specific embodiments. However, one of ordinary skill in the art will appreciate that various modifications and changes can be made to the present invention without departing from the scope of the present invention as set forth in the claims below. For example, the specific embodiment has been discussed in terms of using the SNRref table of FIG. 2 to determine the loading of a bin. One skilled in the art would appreciate that other methods of determining bin loading are capable of being used. Another example of a modification anticipated by the of the present invention would be to identify and weight multiple subsets of bins. In the claims, means-plus-function clause(s), if any, cover the structures described herein that perform the recited function(s). The mean-plus-function clause(s) also cover structural equivalents and equivalent structures that perform the recited function(s).

We claim:

1. A method for optimizing power of a Discrete Multi-Tone communication system when a desired data rate is less than a maximum data rate of the communication system, the method comprising the steps of:

determining a bit loading capacity of a plurality of carriers associated with the communication system;

sorting the plurality of carriers into a sorted order from a greatest capacity to a least capacity;

allocating data bits to the plurality of carriers in the sorted order until the desired data rate is achieved; and reducing power to at least one unused carrier.

2. A method for optimizing power of a Discrete Multi-Tone communication system when a desired data rate is less than a maximum data rate of the communication system, the method comprising the steps of:

determining a bit loading capacity of a plurality of carriers associated with the communication system;

sorting the plurality of carriers to create a sorted list, wherein the sorted list is sorted according to the bit loading capacity;

allocating data capacity to the plurality of carriers according to the sorted list until all of the data capacity is allocated, wherein a bin having a greatest bit loading capacity is completely filled before a bin having less than the greatest bit loading capacity; and reducing power to an unused carrier, wherein the unused carrier has not been allocated any data capacity.

3. The method of claim 2, wherein the step of determining further includes the substeps of:

determining a Signal-to-Noise Ratio (SNR) of the plurality of carriers;

providing a SNR reference table indicating a amount of SNR needed to transmit a specific number of data bits at a predefined Bit Error Rate (BER); and determining the bit loading capacity based upon the SNR of the plurality of carriers and the SNR reference table.

4. The method of claim 2, wherein the step of reducing power includes reducing the power to an unused carrier by a ratio relative to a used carrier.

5. The method of claim 2, wherein the step of reducing power includes reducing the power to an unused carrier by specific amount.

6. A method of optimizing power of a Discrete-Multi-Tone (DMT) communication system, the method comprising the steps of:

defining a set N comprising a plurality of carriers associated with the DMT communications system;

defining a set X which is a subset of the set N, where the set X comprises at least one carrier;

determining a bit loading capacity of each carrier of the set N;

sorting the plurality of carriers of the set N that are not in the set X from a carrier having a greatest bit loading capacity to a carrier having a least bit loading capacity to create a sorted set Y, wherein the sorted set Y has a first member which has the greatest bit loading capacity and a last member which has the least bit loading capacity;

inserting the set X into the sorted set Y to create a set Z;

allocating data capacity beginning with the first member of the set Z, and continuing until all data capacity is allocated or until the last member is filled; and reducing power to at least one carrier in the set Z that does not having data allocated to it.

7. The method of claim 6, wherein the step of reducing power further includes reducing the power to all carriers in the set Z that do not have data allocated to them.

8. The method of claim 6, further comprising the step of: weighting the set X.

9. The method of claim 8, wherein the step of inserting the set X includes the set X being implicitly weighted.

10. The method of claim 9, wherein the set X is heavily weighted relative to a bin of set N having an average bit loading capacity.

11. The method of claim 9, wherein the set X is inserted into the sorted set Y prior to the bin(s) having the greatest bit loading capacity, such that a new first member of the set Z is also a member of the set X.

12. The method of claim 8, wherein the step of weighting the carriers associated with the set X includes the set X being explicitly weighted, wherein, depending upon an explicit weighting value assigned to the set X, the set X can be inserted before all carriers of the set Y, after all carriers of the set Y, between carriers of the set Y, or not included in the set Y.

13. The method of claim 6, wherein the set X is lightly weighted relative to an average bin capacity.

14. The method of claim 13, wherein the set X is inserted into the sorted set Y following the bin(s) having the least bit loading capacity, such that a new last member of the sorted set Y is also a member of the set X.

15. The method of claim 13, wherein the set X is not included into the sorted set Y, whereby no data is allocated to the set X carriers.

16. The method of claim 6 further comprising the step of sorting carriers of the set X from the carrier having a greatest bit loading capacity the carrier having a least bit loading capacity to create a sorted set X.

17. A method of optimizing power of a Discrete Multi-Tone (DMT) communication system, the method comprising:

providing a first DMT line card for transmitting carriers associated with a set of carriers N1 and a second DMT line card for transmitting carriers associated with a set of carriers N2;

specifying a subset of set N1 as a set X1;

specifying a subset of set N2 as a set X2, wherein the carriers of the set X2 do not substantially overlap in frequency with the carriers of the set X1;

allocating bit capacity for the first DMT line card beginning with the carriers of the set X1;

reducing the power to unused carriers of the set X1;

allocating bit capacity for the second DMT line card beginning with the carriers of the set X2;

reducing the power to unused carriers of the set X2;

transmitting data using the first DMT line card; and transmitting data using the second DMT line card.

18. The method of claim 17 further comprising the steps of:

sorting the carriers of the set X1 from a carrier having a greatest bit loading capacity to a carrier having a least bit loading capacity before the step of allocating bit capacity for the first DMT line card.

19. The method of claim 18 further comprising the steps of:

sorting the carriers of the set X2 from the carrier having a greatest bit loading capacity to the carrier having a least bit loading capacity before the step of allocating bit capacity for the second DMT line card.

20. The method of claim 17, wherein set X2 is chosen so that there are no overlapping or directly adjacent carriers between the set X1 and the set X2.

21. A method of optimizing power of a Discrete Multi-Tone (DMT) communication system, the method comprising:

providing a first DMT line card having a set of carriers N1 and a second DMT line card having a set of carriers N2;

specifying a subset of the set N2 as a set X1 for the first DMT line card;

specifying a subset of the set N1 as a set X2 for the second DMT line card, wherein the carriers of the set X2 do not substantially overlap in frequency with the carriers of the set X1;

sorting the carriers of the set N1 that are not in the set X1 from a carrier having a greatest bit loading capacity to a carrier having a least bit loading capacity to create a sorted set Y1, wherein the sorted set Y1 has a first member which has the greatest bit loading capacity and a last member which has the least bit loading capacity;

sorting the carriers of the set X1 from the carrier having a greatest bit loading capacity to the carrier having a least bit loading capacity to create a sorted set X1;

sorting the carriers of the set N2 that are not in the set X2 from the carrier having a greatest bit loading capacity the carrier having a least bit loading capacity to create a sorted set Y2, wherein the sorted set Y2 has a first member which has the greatest bit loading capacity and a last member which has the least bit loading capacity;

sorting the carriers of the set X2 from the carrier having a greatest bit loading capacity to the carrier having a least bit loading capacity to create a sorted set X2;

inserting the sorted set X1 into the set Y1 to create a modified set Y1;

inserting the sorted set X2 into the set Y2 to create a modified set Y2;

allocating bit capacity for the first DMT line card beginning with the first member of the modified set Y1;

reducing the power to unused carriers of the modified set Y1;

allocating bit capacity for the second DMT line card beginning with the first member of the modified set Y2;

reducing the power to unused carriers of the modified set Y2;

transmitting data using the first DMT line card; and transmitting data using the second DMT line card.

* * * * *